(12) United States Patent
Zeng et al.

(10) Patent No.: US 11,139,527 B2
(45) Date of Patent: Oct. 5, 2021

(54) LOWER BOX BODY AND BATTERY BOX

(71) Applicant: CONTEMPORARY AMPEREX TECHNOLOGY CO., LIMITED, Ningde (CN)

(72) Inventors: Yuqun Zeng, Ningde (CN); Fenggang Zhao, Ningde (CN); Xingdi Chen, Ningde (CN); Lei Wang, Ningde (CN); Linggang Zhou, Ningde (CN); Peng Wang, Ningde (CN); Derong Wang, Ningde (CN); Cong Bao, Ningde (CN)

(73) Assignee: CONTEMPORARY AMPEREX TECHNOLOGY CO., LIMITED, Ningde (CN)

( * ) Notice: Subject to any disclaimer, the term of this patent is extended or adjusted under 35 U.S.C. 154(b) by 0 days.

(21) Appl. No.: 17/129,572

(22) Filed: Dec. 21, 2020

(65) Prior Publication Data

US 2021/0111456 A1    Apr. 15, 2021

Related U.S. Application Data

(63) Continuation of application No. 16/663,048, filed on Oct. 24, 2019.

(30) Foreign Application Priority Data

Nov. 1, 2018    (CN) .......................... 201811294857.3

(51) Int. Cl.
*H01M 50/20* (2021.01)
*H01M 50/249* (2021.01)
(Continued)

(52) U.S. Cl.
CPC .............. *H01M 50/20* (2021.01); *B60K 1/04* (2013.01); *B65D 21/0217* (2013.01);
(Continued)

(58) Field of Classification Search
CPC .. H01M 50/20; H01M 50/204; H01M 50/233; H01M 50/242; H01M 50/244;
(Continued)

(56) References Cited

U.S. PATENT DOCUMENTS

| 9,975,416 | B2 | 5/2018 | Hara et al. | |
|---|---|---|---|---|
| 2015/0255764 | A1* | 9/2015 | Loo | B60K 1/04 |
| | | | | 429/149 |
| 2017/0217297 | A1 | 8/2017 | Li | |

FOREIGN PATENT DOCUMENTS

| CN | 101128946 A | 2/2008 |
|---|---|---|
| CN | 203674289 U | 6/2014 |

(Continued)

OTHER PUBLICATIONS

Contemporary Amperex Technology Co., Limited, Extended European Search Report EP19205025.0, dated Mar. 27, 2020, 8 pgs.
(Continued)

*Primary Examiner* — Maria Laios
*Assistant Examiner* — Grace Ann Kenlaw
(74) *Attorney, Agent, or Firm* — Morgan, Lewis & Bockius LLP

(57) ABSTRACT

The present disclosure provides a lower box body, a battery box and a vehicle, the lower box body comprises a base body, a first protecting assembly, a mounting hole. The base body comprises a bottom plate portion, a side plate portion, eave portions. The first protecting assembly is provided at outside of the base body, fixed to the base body and is attached to the eave portion. The mounting hole penetrates the eave portion and the first protecting assembly. The first protecting assembly improves the entirety structural strength of the lower box. Because the mounting hole is formed by penetrating the eave portion and the first protecting assembly, the structural stability of the mounting location of the lower box body is improved, thereby making the mounting
(Continued)

location of the lower box body not be prone to be deformed or damaged when the battery box is subjected to the external force.

18 Claims, 6 Drawing Sheets

(51) Int. Cl.
    *H01M 50/242*     (2021.01)
    *H01M 50/244*     (2021.01)
    *B60K 1/04*     (2019.01)
    *B60L 50/60*     (2019.01)
    *B65D 21/02*     (2006.01)

(52) U.S. Cl.
    CPC ....... *H01M 50/242* (2021.01); *H01M 50/244* (2021.01); *H01M 50/249* (2021.01); *B60K 2001/0438* (2013.01); *B60L 50/66* (2019.02)

(58) Field of Classification Search
    CPC .... H01M 50/271; H01M 2/10; H01M 2/1016; H01M 2/1077; H01M 2/1072; H01M 2/1083; B60K 2001/0438; B60L 50/66
    See application file for complete search history.

(56) References Cited

FOREIGN PATENT DOCUMENTS

| | | |
|---|---|---|
| CN | 205871713 U | 1/2017 |
| CN | 206312983 U | 7/2017 |
| CN | 206921896 U | 1/2018 |
| CN | 108389992 A | 8/2018 |
| CN | 209176494 U | 7/2019 |
| JP | 2018163740 A | 1/2018 |
| KR | 101383721 B1 | 4/2014 |
| WO | WO-2017073416 A1 * | 5/2017 ........... H01M 50/20 |
| WO | WO2017073416 A1 | 5/2017 |

OTHER PUBLICATIONS

Contemporary Amperex Technology Co., Limited, International Search Report and Written Opinion, PCT/CN2019/114415, dated Feb. 12, 2020, 11 pgs.

* cited by examiner

LOWER BOX BODY AND BATTERY BOX

CROSS-REFERENCE TO RELATED APPLICATIONS

This application is a continuation application of U.S. patent application Ser. No. 16/663,048, filed on Oct. 24, 2019, which claims priority to Chinese Patent Application No. 201811294857.3, filed with the State Intellectual Property Office of the People's Republic of China on Nov. 1, 2018, all of which are incorporated herein by reference in their entirety.

FIELD OF THE PRESENT DISCLOSURE

The present disclosure relates to the field of battery technology, and particularly relates to a lower box body, a battery box and a vehicle.

BACKGROUND OF THE PRESENT DISCLOSURE

With the popularization and promotion of new energy vehicles, the safe reliability of the new energy vehicles has increasingly attracted people's attention and importance. As one of the core components of the new energy vehicles, the safety performance of the battery box directly affects the safety performance of the new energy vehicles. The lower box body serves as the core load-bearing component of the battery box, and the structural strength reliability of the lower box body directly affects the safe reliability of the battery box.

In order to achieve a fixed mounting between the battery box and the new energy vehicle, the lower box body is usually provided with a mounting hole, and the battery box is fixed to the new energy vehicle through the mounting hole. During the driving of the new energy vehicles, when the road is not flat, the battery box will be subjected to vibration and impact, because the mounting location of the lower box body (i.e., the mounting hole and the part near the mounting hole) bears the load of the entire battery box, the mounting location of the lower box body is most prone to be deformed or damaged after continuously subjected to vibration and impact.

SUMMARY OF THE PRESENT DISCLOSURE

In view of the problem existing in the background, an object of the present disclosure is to provide a lower box body, a battery box and a vehicle, which improve the structural stability of the mounting location of the lower box body.

In order to achieve the above object, in a first aspect, the present disclosure provides a lower box body, which comprises a base body, a first protecting assembly and provides with a mounting hole. The base body comprises a bottom plate portion, a side plate portion and eave portions, the side plate portion protrudes from the bottom plate portion in an up-down direction, and each eave portion is connected to one end of the side plate portion away from the bottom plate portion and extends toward an outside of the side plate portion. The first protecting assembly is provided at an outside of the base body in the up-down direction and is fixed to the base body, and the first protecting assembly is attached to the eave portion. The mounting hole penetrates the eave portion and the first protecting assembly attached to the eave portion in the up-down direction.

The first protecting assembly comprises a first protecting plate. The first protecting plate comprises a first upper edge portion attached to the eave portion, a first side edge portion attached to the side plate portion, and a first lower edge portion attached to the bottom plate portion. The mounting hole penetrates the eave portion and the first upper edge portion in the up-down direction.

The base body further comprises a plurality of protruding portions spaced apart from each other and extending in a longitudinal direction, each protruding portion protrudes from the bottom plate portion in the up-down direction, and each protruding portion and the bottom plate portion form a passage. The first protecting plate further comprises a first projection portion protruding from the first lower edge portion in the up-down direction, and the first projection portion is larger than the protruding portion in height in the up-down direction.

The first protecting assembly further comprises a supporting column provided at an outside of the first upper edge portion of the first protecting plate in the up-down direction; the mounting hole penetrates the eave portion, the first upper edge portion and the supporting column in the up-down direction.

The first protecting assembly further comprises an adapter plate provided between the first protecting plate and the supporting column. The mounting hole penetrates the eave portion, the first upper edge portion, the adapter plate and the supporting column in the up-down direction.

The adapter plate comprises a second upper edge portion provided at the outside of the first upper edge portion, a second side edge portion provided at an outside of the first side edge portion, a second lower edge portion provided at an outside of the first lower edge portion, and a second projection portion extending from one side of the second side edge portion facing the supporting column toward the supporting column. The supporting column is fixedly connected with the second upper edge portion and the second projection portion.

The lower box body further comprises a second protecting assembly provided at an outside of the first protecting assembly in the up-down direction, and the second protecting assembly is attached to the first protecting assembly and a corresponding portion of the base body. The mounting hole penetrates the eave portion, the first protecting assembly and the second protecting assembly in the up-down direction.

The first protecting assembly and the second protecting assembly each are provided as multiple in number, the multiple second protecting assemblies and the multiple first protecting assemblies form a three-dimensional network structure.

The second protecting assembly comprises a second protecting plate attached to the first protecting assembly and the corresponding portion of the base body, and a connecting plate provided on one side of the second protecting plate away from the first protecting assembly in the up-down direction and attached to the second protecting plate and the first protecting assembly. The mounting hole penetrates the eave portion, the first protecting assembly, the second protecting plate and the connecting plate in the up-down direction.

The second protecting plate comprises a first mounting portion attached to the first protecting assembly, a second mounting portion formed at one side of the first mounting portion and attached to the corresponding portion of the base body, and a third projection portion protruding from the second mounting portion in the up-down direction. The mounting hole penetrates the eave portion, the first protecting assembly, the first mounting portion and the connecting plate in the up-down direction.

The second protecting plate further comprises a backing plate fixedly provided between the second protecting plate and the corresponding first protecting assembly. The mounting hole penetrates the eave portion, the first protecting assembly, the backing plate, the second protecting plate and the connecting plate in the up-down direction. Moreover, the lower box body further comprises a supporting plate face each other with the side plate portion of the base body and fixedly connected with the first protecting assembly and the second protecting assembly.

In a second aspect, the present disclosure further provides a battery box, which comprises an upper box body and the lower box body described above.

In a third aspect, the present disclosure further provides a vehicle, which comprises the battery box described above.

The present disclosure has the following beneficial effects: the first protecting assembly improves the entirety structural strength of the lower box. Because the mounting hole is formed by penetrating the eave portion of the base body and the first protecting assembly attached to the eave portion, the structural stability of the mounting location of the lower box body is improved, thereby making the mounting location of the lower box body not be prone to be deformed or damaged when the battery box is subjected to the external force.

Figure 1:
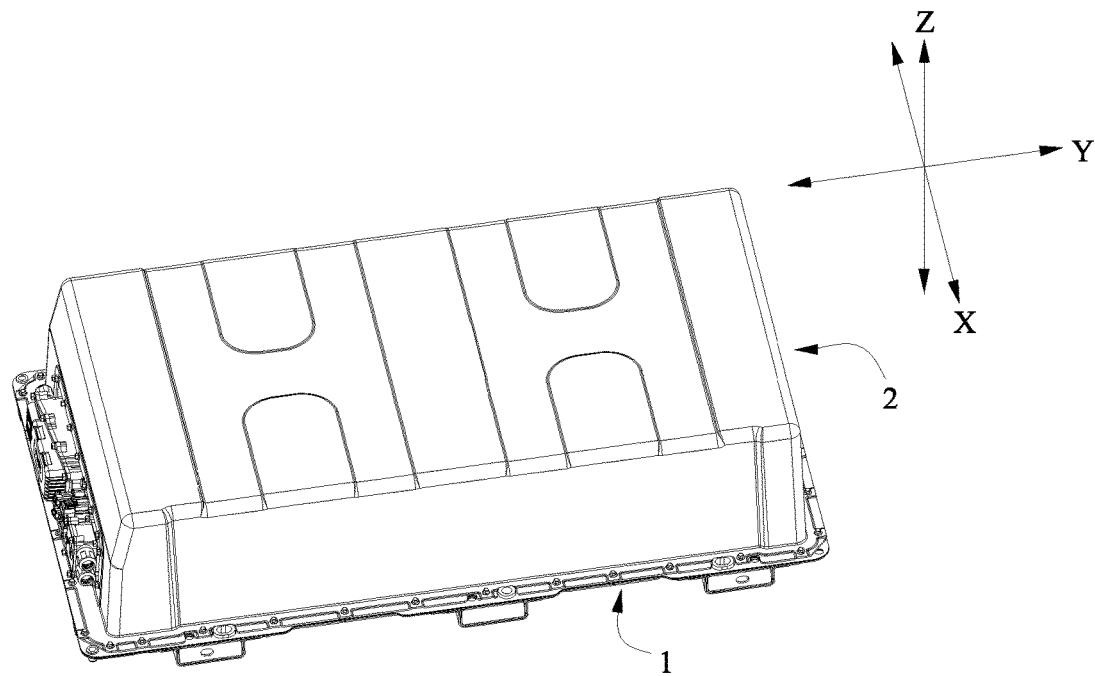
FIG. 1 is a perspective view of a battery box of the present disclosure.

Reference numerals are represented as follows:
1 lower box body
  11 base body
    111 bottom plate portion
    112 side plate portion
    113 eave portion
    114 protruding portion
    115 passage
  12 first protecting assembly
    121 first protecting plate
121A first upper edge portion
121B first side edge portion
121C first lower edge portion
121D first projection portion
    122 supporting column
    123 adapter plate
      123A second upper edge portion
      123B second side edge portion
      123C second lower edge portion
      123D second projection portion
  13 second protecting assembly
    131 second protecting plate
      131A first mounting portion
      131B second mounting portion
      131C third projection portion
      131D first rim portion
      131E protrusion
    132 connecting plate
      132A main body portion
      132B second rim portion
      132C third rim portion
      132D first avoiding hole
      132E second avoiding hole
    133 backing plate
  14 supporting plate
2 upper box body
T mounting hole
  T1 first through hole
  T2 second through hole
  T3 third through hole
  T4 fourth through hole
  T5 fifth through hole
  T6 sixth through hole
  T7 seventh through hole
X transversal direction
Y longitudinal direction
Z up-down direction

DETAILED DESCRIPTION

To make the object, technical solutions, and advantages of the present disclosure more apparent, hereinafter the present disclosure will be further described in detail in combination with the accompanying figures and the embodiments. It should be understood that the specific embodiments described herein are merely used to explain the present disclosure but are not intended to limit the present disclosure.

In the description of the present disclosure, unless otherwise specifically defined and limited, the terms "first", "second", "third" and the like are only used for illustrative purposes and are not to be construed as expressing or implying a relative importance. The term "plurality" is two or more. Unless otherwise defined or described, the terms "connect", "fix" should be broadly interpreted, for example, the term "connect" can be "fixedly connect", "detachably connect", "integrally connect", "electrically connect" or "signal connect". The term "connect" also can be "directly connect" or "indirectly connect via a medium". For the persons skilled in the art, the specific meanings of the abovementioned terms in the present disclosure can be understood according to the specific situation.

In the description of the present disclosure, it should be understood that spatially relative terms, such as "up", "down" and the like, are described based on orientations illustrated in the figures, but are not intended to limit the embodiments of the present disclosure. In addition, in the context, it should also be understood that when an element is provided "outside" or "inside" of another element, it can be directly provided "outside" or "inside" of the other element, or be indirectly provided "outside" or "inside" of the another element by an intermediate element.

Referring to FIG. 1, a battery box of the present disclosure comprises a lower box body 1 and an upper box body 2. The upper box body 2 is assembled with the lower box body 1. The lower box body 1 is provided with a mounting hole T, and the mounting hole T is used to fixedly mount the battery box to an external device (such as a body of an electric vehicle). The mounting hole T may be a smooth hole (no thread is provided) or a threaded hole.

Figure 2:
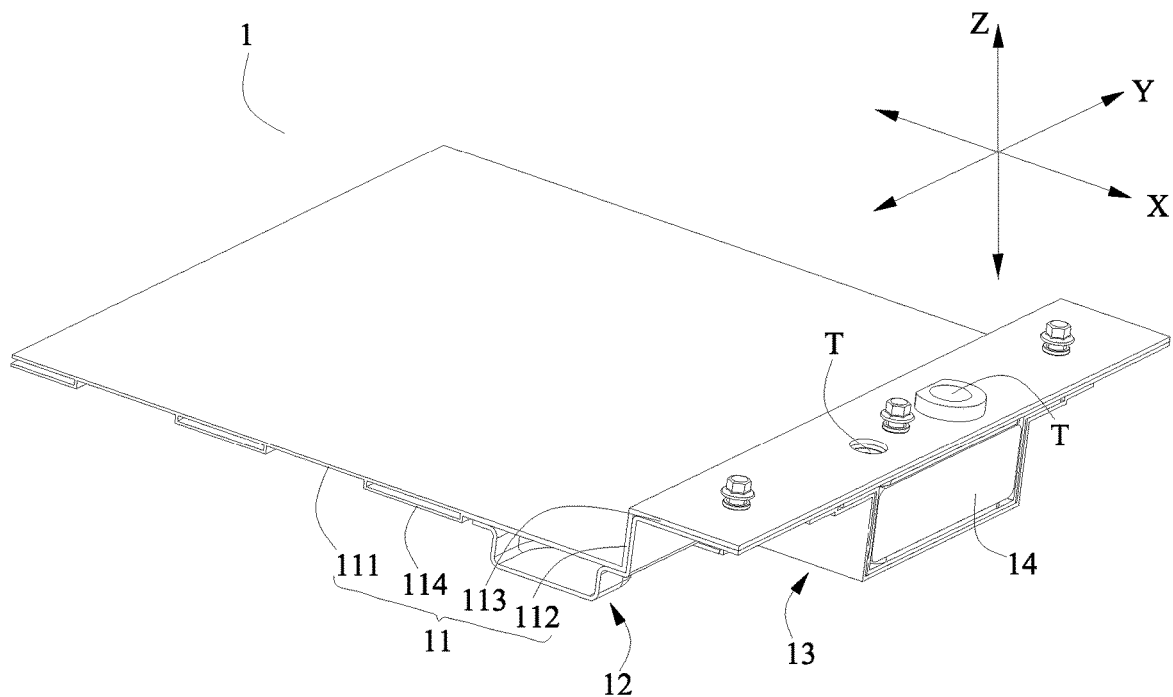
FIG. 2 is a partial perspective view of the lower box body of FIG. 1.
Figure 3:
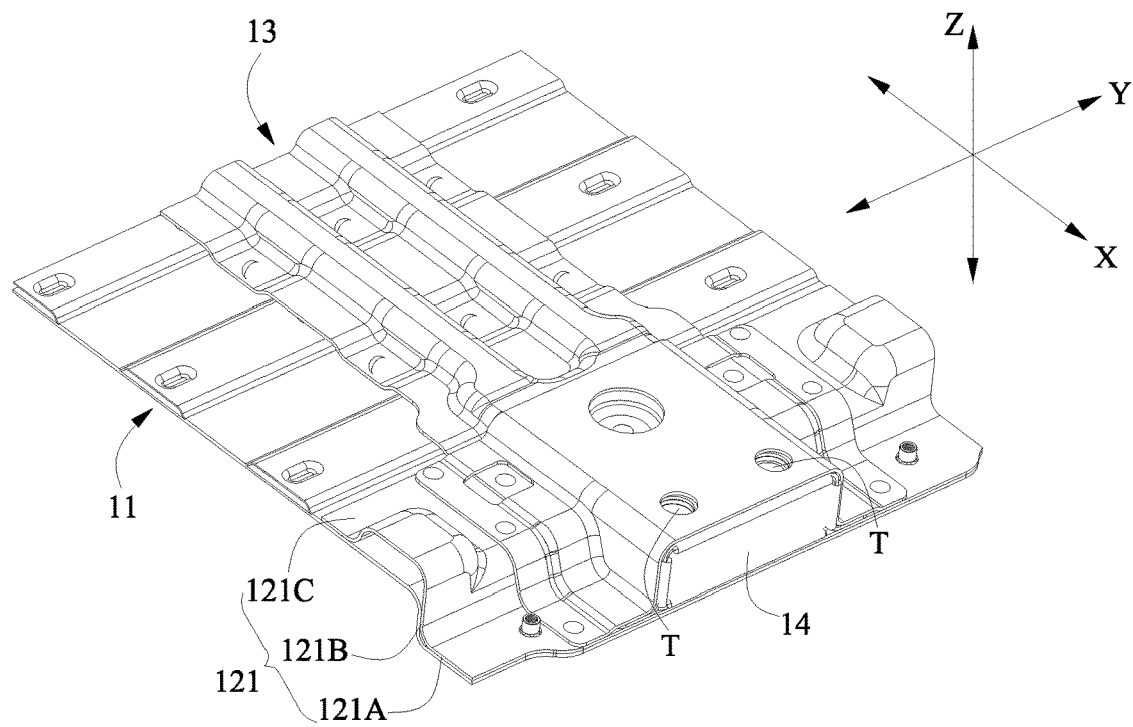
FIG. 3 is a view of FIG. 2 viewed from below.

Referring to FIG. 2 and FIG. 3, the lower box body 1 may comprise a base body 11, a first protecting assembly 12, a second protecting assembly 13 and a supporting plate 14.

Referring to FIG. 2 to FIG. 5, the base body 11 comprises a bottom plate portion 111, a side plate portion 112, eave portions 113 and a plurality of protruding portions 114. The side plate portion 112 protrudes from the bottom plate portion 111 in an up-down direction Z, and the side plate portion 112 integrally forms an encircled frame structure in a transversal direction X and a longitudinal direction Y. Each eave portion 113 is connected to one end of the side plate portion 112 away from the bottom plate portion 111 and extends toward an outside of the side plate portion 112, and the eave portions 113 comprises an eave portion 113 in the transversal direction X and an eave portion 113 in the longitudinal direction Y. The plurality of protruding portions 114 are spaced apart from each other and extend in the longitudinal direction Y, and each protruding portion 114 protrudes from the bottom plate portion 111 in the up-down direction Z, each protruding portion 114 and the bottom plate portion 111 form a passage 115. A flow medium can be placed in the passage 115 for heating or dissipating the battery box.

Referring to FIG. 2 and FIG. 3, the first protecting assembly 12 is provided at an outside of the base body 11 in the up-down direction Z and is fixed to the base body 11. The second protecting assembly 13 is provided at an outside of the first protecting assembly 12 in the up-down direction Z, and the second protecting assembly 13 is attached to the first protecting assembly 12 and a corresponding portion of the base body 11. When the lower box body 1 is subjected to impact from an external force, the second protecting assembly 13 and the first protecting assembly 12 can disperse and transmit the external force to different parts of the base body 11, thereby avoiding the damage of base body 11 caused by the excessive local force.

The first protecting assembly 12, the second protecting assembly 13 and the base body 11 can be connected as a unity by welding, thereby improving the connection strength between the components, and further improving the structural strength of the entire lower box body 1.

Both the first protecting assembly 12 and the second protecting assembly 13 each are provided as multiple in number, the multiple second protecting assemblies 13 and the multiple first protecting assemblies 12 are attached to each other to form a three-dimensional network structure. The three-dimensional network structure is attached to different parts of the base body 11 to support the base body 11, when the lower box body 1 is subjected to impact from the external force, the three-dimensional network structure can disperse and transmit the external force to different parts of the base body 11 respectively along the transversal direction X, the longitudinal direction Y and the up-down direction Z, thereby avoiding the damage of base body 11 caused by the excessive local force.

Specifically, referring to FIG. 1, the first protecting assembly 12 may be provided as two in number, the two first protecting assemblies 12 are spaced apart from each other in the transversal direction X; the second protecting assembly 13 may be provided as three in number, the three second protecting assembly 13 are spaced apart from each other in the longitudinal direction Y, and the two ends of each second protecting assembly 13 in the transversal direction X are respectively fixedly connected with the two first protecting assemblies 12.

In an embodiment, the first protecting assembly 12 may be perpendicular or approximately perpendicular to the second protecting assembly 13, such an arrangement is particularly suitable to the base body 11 having a regular structure (such as a rectangle). At this time, the three-dimensional network structure formed by the first protecting assemblies 12 and the second protecting assemblies 13 can be matched with the structure of the base body 11, therefore it minimizes the using number of the first protecting assemblies 12 and the second protecting assemblies 13, thereby reducing the weight of the lower box body 1.

In another embodiment, a certain angle (e.g., the angle of 60°) can be formed between the first protecting assembly 12 and the second protecting assembly 13, such an arrangement is particularly suitable to the base body 11 having an irregular structure. At this time, when the lower box body 1 is subjected to impact from the external force, the three-dimensional network structure formed by the first protecting assemblies 12 and the second protecting assemblies 13 can further disperse the external force by the angle.

Figure 4:
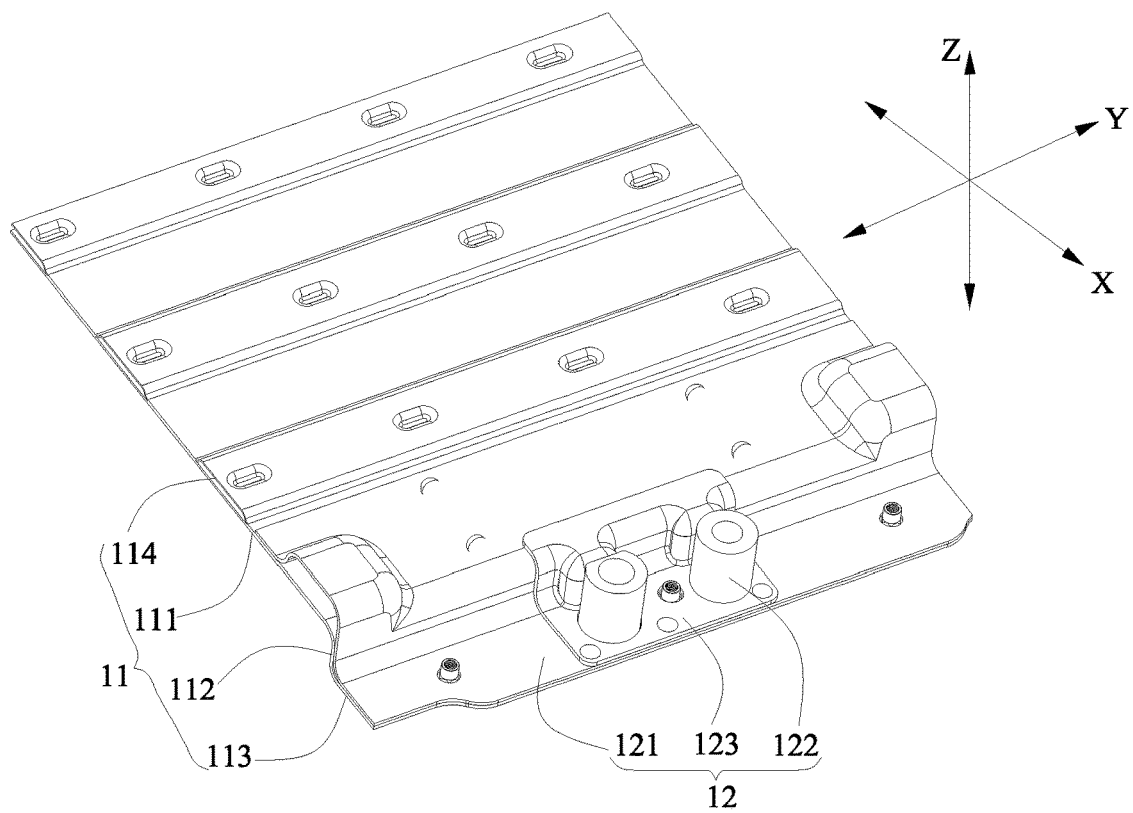
FIG. 4 is a perspective view of the lower box body of FIG. 3 with a second protecting assembly removed.

Referring to FIG. 2 to FIG. 4, the first protecting assembly 12 is attached to the eave portion 113 of the base body 11. The mounting hole T penetrates the eave portion 113 of the base body 11 and the first protecting assembly 12 attached to the eave portion 113 in the up-down direction Z.

The first protecting assembly 12 can be attached to the eave portion 113 of the base body 11 by welding, thereby improving the structural strength of the eave portion 113 of the base body 11. Because the mounting hole T is formed by penetrating the eave portion 113 of the base body 11 and the first protecting assembly 12 attached to the eave portion 113, the structural stability of the mounting location of the lower box body 1 is improved, thereby making the mounting location of the lower box body 1 not be prone to be deformed or damaged when the battery box is subjected to the external force. It should be noted that, the mounting location of the lower box body 1 refers to a portion of the lower box body 1 where the mounting hole T is provided on, and comprises the mounting hole T and a part of the lower box body 1 near the mounting hole T.

Figure 6:
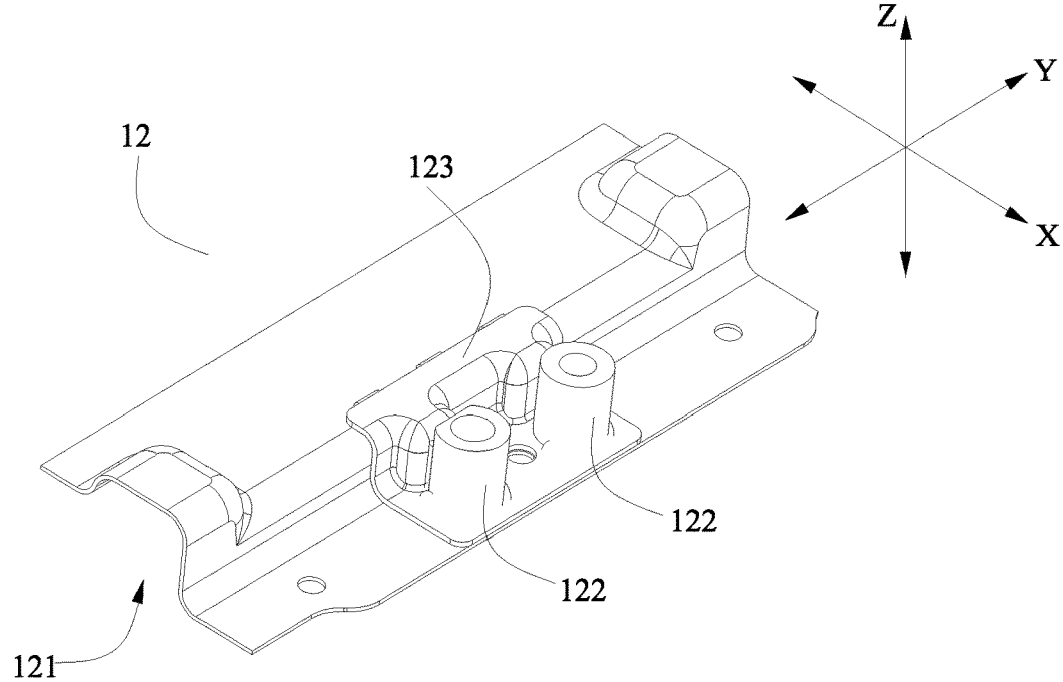
FIG. 6 is a perspective view of a first protecting assembly of FIG. 4.

Referring to FIG. 4 and FIG. 6, the first protecting assembly 12 may comprise a first protecting plate 121, a supporting column 122 and an adapter plate 123.

Figure 7:
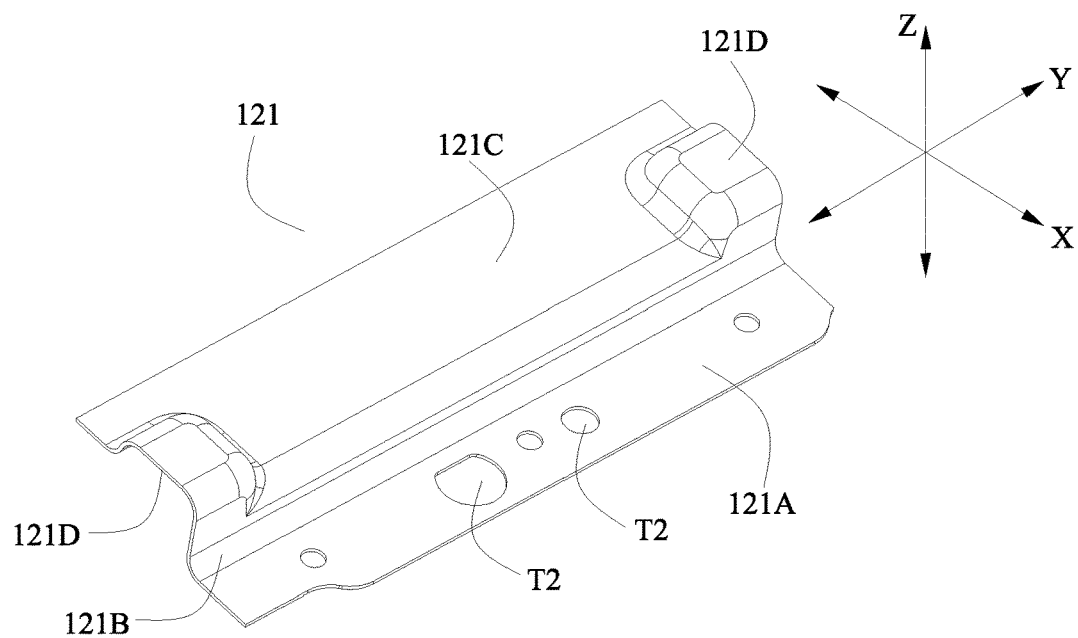
FIG. 7 is a perspective view of a first protecting plate of FIG. 6.

Referring to FIG. 3 and FIG. 7, the first protecting plate 121 may comprise: a first upper edge portion 121A attached to the eave portion 113 of the base body 11; a first side edge portion 121B attached to the side plate portion 112 of the base body 11; and a first lower edge portion 121C attached to a portion of the bottom plate portion 111 close to the side plate portion 112. At this time, the mounting hole T penetrates the eave portion 113 and the first upper edge portion 121A of the first protecting plate 121 in the up-down direction Z.

Because the first upper edge portion 121A, the first side edge portion 121B and the first lower edge portion 121C of the first protecting plate 121 are respectively attached to different portions of the base body 11, the first protecting plate 121 is formed approximately as a Z-shaped structure. When a fixing member mounts the lower box body 1 to the external device through the mounting hole T, a portion of the force acting on the mounting location of the lower box body 1 by the fixing member is directly transmitted to the base body 11, a portion of the force is transmitted to the first lower edge portion 121C via the first upper edge portion 121A and is finally transmitted to the base body 11, at this time the two portions of the force can be partially counteracted based on the Z-shaped structure of the first protecting plate 121, thereby improving the bending-resistance strength of the mounting location of the lower box body 1.

In addition, the first upper edge portion 121A improves the structural strength of the eave portion 113 of the base body 11, the first side edge portion 121B improves the structural strength of the side plate portion 112 of the base body 11, the first lower edge portion 121C improves the structural strength of the bottom plate portion 111 of the base body 11, thereby greatly improving the structural strength of the entire lower box body 1.

Referring to FIG. 3 and FIG. 7, the first protecting plate 121 may further comprises a first projection portion 121D protruding from the first lower edge portion 121C in the up-down direction Z. The first projection portion 121D, the first upper edge portion 121A, the first side edge portion 121B and the first lower edge portion 121C are formed in a Π-shaped structure, thereby enhancing the structural strength of the first protecting plate 121 itself. In order to protect the passage 115 of the base body 11, the first projection portion 121D is larger than the protruding portion 114 of the base body 11 in height in the up-down direction Z.

Figure 8:
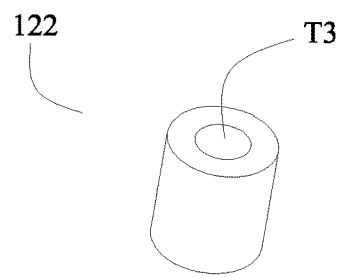
FIG. 8 is a perspective view of a supporting column of FIG. 6.

Referring to FIG. 4, FIG. 6 and FIG. 8, the supporting column 122 may be a cylindrical structure, and the supporting column 122 may be erected at an outside of the first protecting plate 121 in an axial direction of the supporting column 122. The axial direction of the supporting column 122 described herein is parallel to the up-down direction Z. Based on the arrangement of the supporting column 122, the thickness of the mounting location of the lower box body 1 in the up-down direction Z is significantly increased, and the mounting hole T penetrates the supporting column 122, when the fixing member passes through the mounting hole T, the supporting column 122 can limit the displacement of the fixing member in a plane formed by the transversal direction X and the longitudinal direction Y, it avoids the offset of the fixing member during the process of mounting and using (because the force acting on the mounting location is increased toward an offset direction, it causes the tearing of the mounting hole T), thereby improving the structural stability of the mounting location of the lower box body 1.

Referring to FIG. 4 and FIG. 6, the adapter plate 123 is fixedly provided between the first protecting plate 121 and the supporting column 122. The mounting hole T penetrates the eave portion 113 of the base body 11, the first protecting plate 121, the adapter plate 123 and the supporting column 122 in the up-down direction Z. Here, the mounting tolerance between the first protecting plate 121 and the supporting column 122 can be filled up by the arrangement of the adapter plate 123, and when the lower box body 1 is subjected to impact from the external force, a portion of the external force can be dispersed and transferred through the adapter plate 123, thereby further enhancing the rigidity of the mounting location of the lower box body 1.

Figure 9:
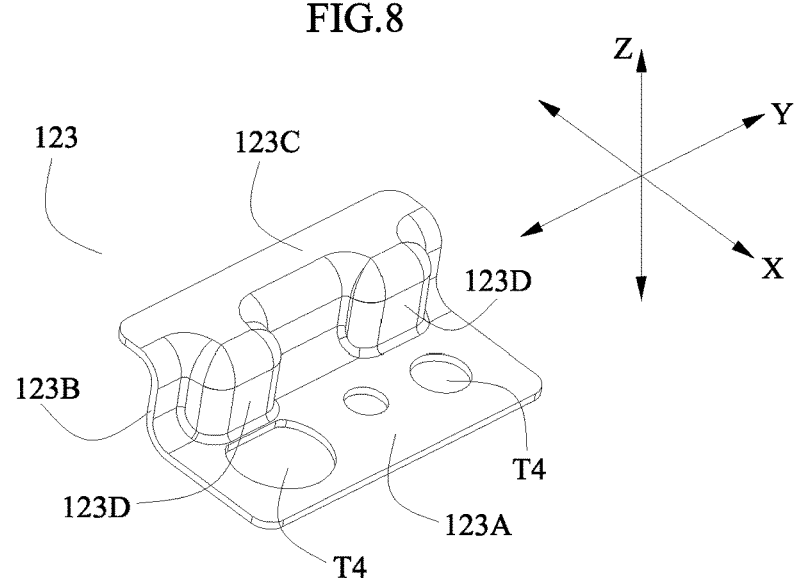
FIG. 9 is a perspective view of an adapter plate of FIG. 6.

Specifically, referring to FIG. 9, the adapter plate 123 may comprise: a second upper edge portion 123A provided at an outside of the first upper edge portion 121A; a second side edge portion 123B provided at an outside of the first side edge portion 121B; a second lower edge portion 123C provided at an outside of a portion of the first lower edge portion 121C close to the first side edge portion 121B; and a second projection portion 123D extending from one side of the second side edge portion 123B facing the supporting column 122 toward the supporting column 122. A surface of the supporting column 122 in the axial direction is fixedly connected with the second upper edge portion 123A, and an outer peripheral surface of the supporting column 122 in a radial direction is fixedly connected with the second projection portion 123D.

Because the fixed connection between the supporting column 122 and the second upper edge portion 123A allows the force of the supporting column 122 received to be transmitted in the axial direction and the fixed connection between the supporting column 122 and the second projection portion 123D allows the force of the supporting column 122 received to be transmitted in the radial direction, the mounting location of the lower box body 1 is not prone to be deformed or damaged when the battery box is subjected to impact from the external force.

In the lower box body 1 of the battery box, the first lower edge portion 121C of the first protecting plate 121 and the bottom plate portion 111 of the base body 11 may be connected by two-layer spot welding, the first upper edge portion 121A of the first protecting plate 121, the eave portion 113 of the base body 11 and the second upper edge portion 123A of the adapter plate 123 may be connected by three-layer spot welding, so that the first protecting assembly 12 and the base body 11 can be connected as one body by welding.

Referring to FIG. 2 and FIG. 3, the second protecting assembly 13 may be attached to the first protecting assembly 12 and the corresponding portion of the base body 11 by welding, and the mounting hole T penetrates the eave portion 113 of the base body 11, the first protecting assembly 12 and the second protecting assembly 13 in the up-down direction Z. The first protecting assemblies 12 and the second protecting assemblies 13 together improve the structural strength of the mounting location of the lower box body 1, when the lower box body 1 is subjected to impact from the external force, the lower box body 1 can disperse and transmit the external force by the three-dimensional network structure formed by the second protecting assemblies 13 and the first protecting assemblies 12, thereby avoiding the damage problem of base body 11 caused by the excessive local force.

Figure 10:
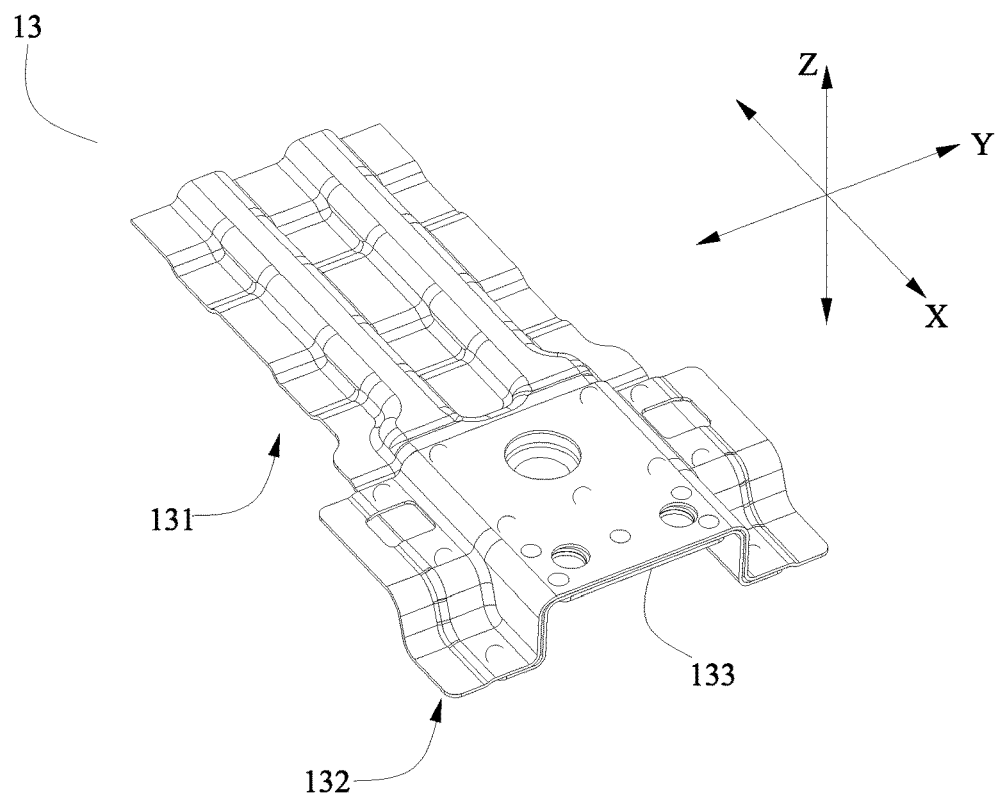
FIG. 10 is a perspective view of the second protecting assembly of FIG. 3.
Figure 11:
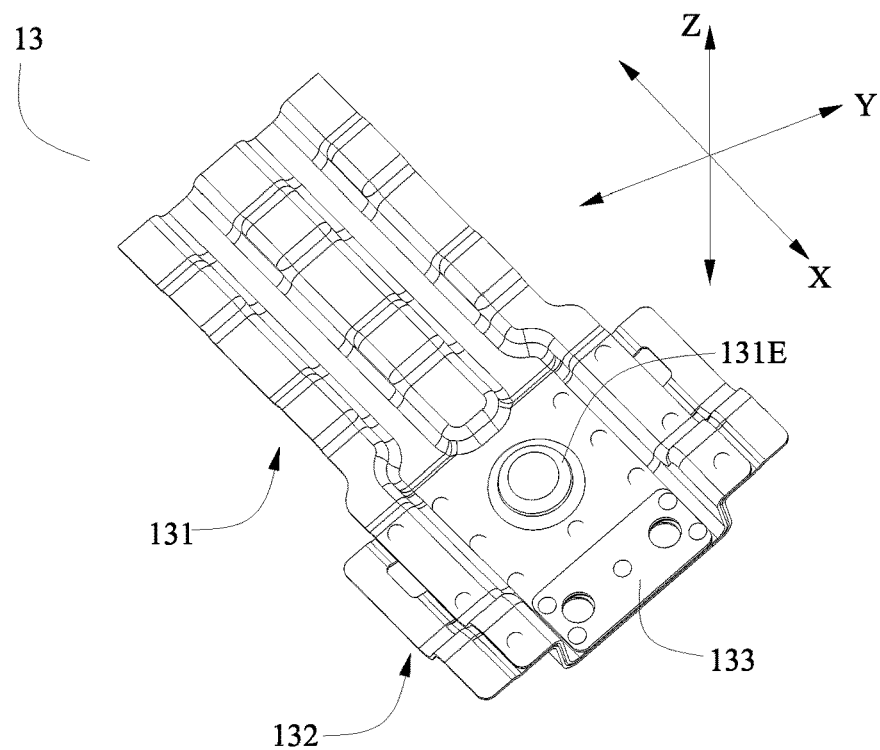
FIG. 11 is a view of the second protecting assembly of FIG. 10 viewed from below.

Referring to FIG. 10 and FIG. 11, the second protecting assembly 13 may comprise a second protecting plate 131, a connecting plate 132 and a backing plate 133.

Referring to FIG. 3, the second protecting plate 131 is attached to the first protecting assembly 12 and the corresponding portion of the base body 11. Specifically, referring to FIG. 12, the second protecting plate 131 may comprises: a first mounting portion 131A attached to the first protecting assembly 12; a second mounting portion 131B formed at one side of the first mounting portion 131A and attached to the corresponding portion of the base body 11; and a third projection portion 131C protruding from the second mounting portion 131B in the up-down direction Z. The mounting hole T penetrates the eave portion 113, the first protecting assembly 12, the first mounting portion 131A and the connecting plate 132 in the up-down direction Z.

The third projection portion 131C is a rib-like structure, the first mounting portion 131A and a first rim portion 131D located at both sides of the first mounting portion 131A form a Π-shaped structure, thereby enhancing the structural strength of the second protecting plate 131. The third projection portion 131C protrudes from the second mounting portion 131B in a direction away from the base body 11, when the lower box body 1 is subjected to impact from the external force, the external force can firstly contact the third projection portion 131C, thereby achieving the protecting of the base body 11.

When the battery box is used in a humid environment or a rainy environment, water may accumulate between the second protecting plate 131 and the base body 11, because the second protecting plate 131 and the base body 11 are metal-welded connection, and if they contact the water for a long time, the welded portion of them will be corroded, thereby causing the connection failure or even the corrosion and damage of the components. In order to discharge the water from the battery box in time, the third projection portion 131C of the second protecting plate 131 may be provided with a through hole to discharge the water. Similarly, the first projection portion 121D of the first protecting plate 121 may also be provided with a through hole to discharge the water.

Figure 12:
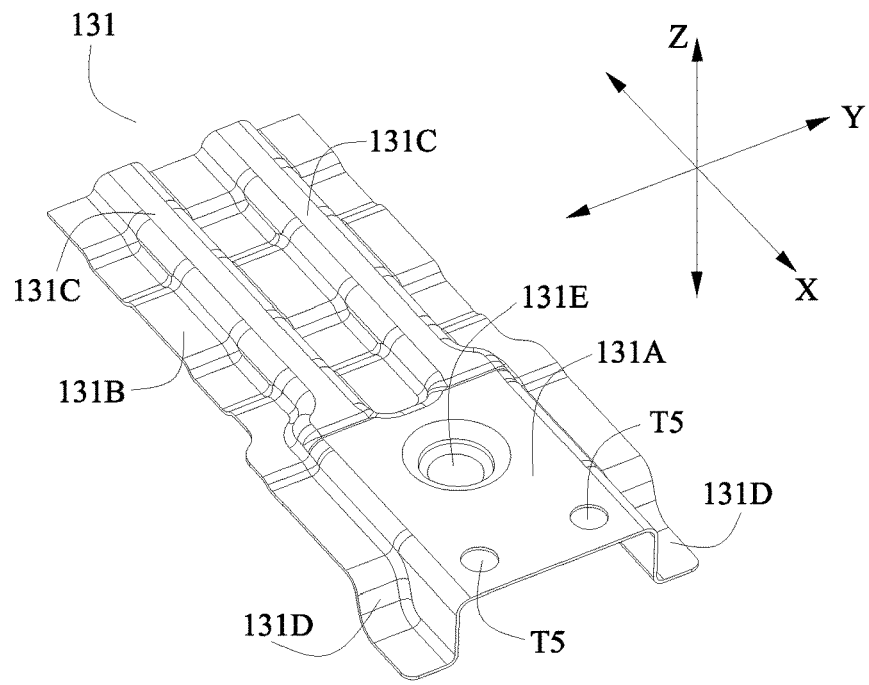
FIG. 12 is a perspective view of a second protecting plate of FIG. 10.

Referring to FIG. 12, the second protecting plate 131 may further comprise: a first rim portion 131D formed on both sides of the first mounting portion 131A and fixedly connected with the eave portion 113 of the base body 11.

Referring to FIG. 11 and FIG. 12, the second protecting plate 131 may further comprise: a protrusion 131E protruding from a surface of the first mounting portion 131A facing the first protecting assembly 12 and attached to the first protecting plate 121. The protrusion 131E is used to support the first protecting assembly 12 and the base body 11, which improves the structural strength of the lower box body 1.

Referring to FIG. 10 and FIG. 11, the connecting plate 132 is provided on one side of the second protecting plate 131 away from the first protecting assembly 12 in the up-down direction Z and attached to the second protecting plate 131 and the first protecting assembly 12, and the connecting plate 132 is fixedly connected with the second protecting plate 131 and the first protecting assembly 12.

Because the connecting plate 132 is attached to the second protecting plate 131 and the first protecting assembly 12 at the same time and is fixedly connected with the second protecting plate 131 and the first protecting assembly 12, the connection stability between the second protecting plate 131 and the first protecting assembly 12 is improved, thereby avoiding the connection failure between the second protecting plate 131 and the first protecting assembly 12 caused by impact from the external force. Moreover, when the lower box body 1 is subjected to impact from the external force, the connecting plate 132 can directly disperse the external force to the second protecting plate 131 and the first protecting assembly 12, therefore it reduces the structural damage of the second protecting plate 131 caused by the external force directly acting on the second protecting plate 131. In addition, the connecting plate 132 partially strengthens the structural strength of the second protecting assembly 13, and the mounting hole T penetrates the second protecting plate 131 and the connecting plate 132, thereby improving the structural stability of the mounting location of the lower box body 1.

Figure 13:
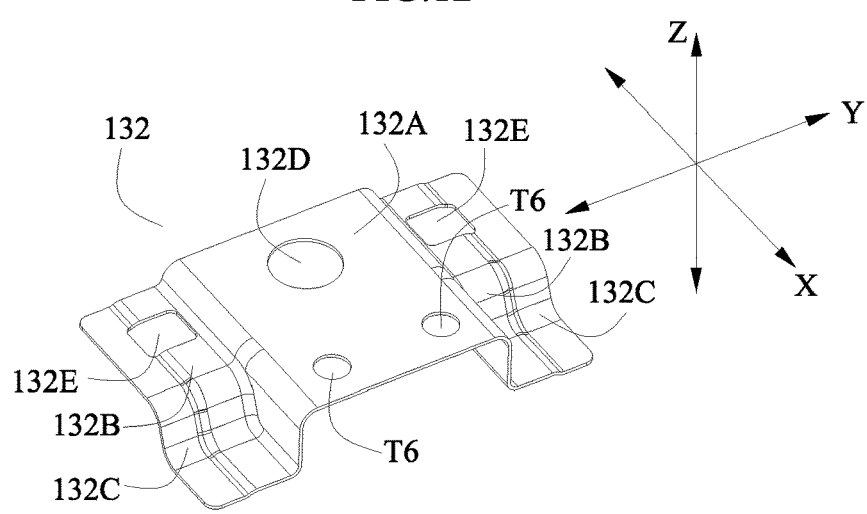
FIG. 13 is a perspective view of a connecting plate of FIG. 10.

Referring to FIG. 13, the connecting plate 132 may comprise: a main body portion 132A; and a second rim portion 132B formed on both sides of the main body portion 132A. The main body portion 132A of the connecting plate 132 is provided at an outside of the corresponding first mounting portion 131A and is attached to the corresponding first mounting portion 131A, the second rim portion 132B is provided at an outside of the corresponding first rim portion 131D and is attached to the corresponding first rim portion 131D.

Referring to FIG. 13, the connecting plate 132 may further comprise: a third rim portion 132C formed on one side of the second rim portion 132B. The third rim portion 132C is provided at an outside of a corresponding portion of the first protecting plate 121 of the first protecting assembly 12 and is attached to the corresponding portion of the first protecting plate 121.

Because the main body portion 132A of the connecting plate 132 is fixedly connected to the first mounting portion 131A of the second protecting plate 131, both the protrusion 131E of the second protecting plate 131 and the third rim portion 132C of the connecting plate 132 are fixedly connected to the first protecting plate 121, it ensures the connection strength between the second protecting assembly 13 and the first protecting assembly 12.

Referring to FIG. 13, in order to facilitate the welding, the connecting plate 132 may be provided with: a first avoiding hole 132D provided on the main body portion 132A and used to expose the corresponding protrusion 131E of the second protecting plate 131 to the connecting plate 132; and a second avoiding hole 132E provided on the second rim portion 132B and used to expose the corresponding first rim portion 131D to the connecting plate 132. The first rim portion 131D of the second protecting plate 131, the first protecting plate 121 and the eave portion 113 of the base body 11 realize the connection of three-layer spot welding through the second avoiding hole 132E, the protrusion 131E of the second protecting plate 131, the first lower edge portion 121C of the first protecting plate 121 and the bottom plate portion 111 of the base body 11 realize the connection of three-layer spot welding through the first avoiding hole 132D.

Figure 14:
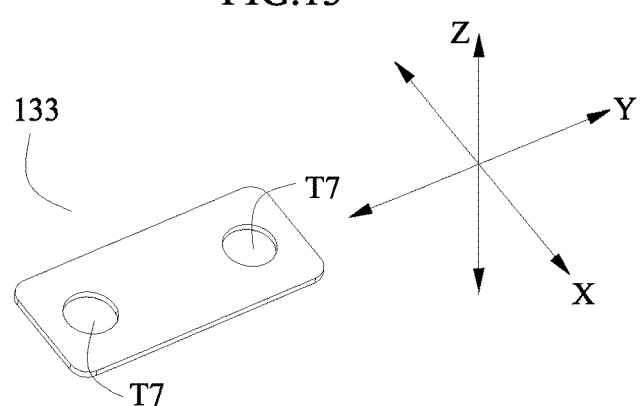
FIG. 14 is a perspective view of a backing plate of FIG. 10.

Referring to FIG. 10, FIG. 11 and FIG. 14, the backing plate 133 is fixedly provided between the second protecting plate 131 and the corresponding first protecting assembly 12. The arrangement of the backing plate 133 facilitates the welding between the second protecting assembly 13 and the supporting column 122 of the first protecting assembly 12. The backing plate 133 also partially strengthens the structural strength of the second protecting assembly 13, and the mounting hole T penetrates the second protecting plate 131, the connecting plate 132 and the backing plate 133, thereby further improving the rigidity of the mounting location of the lower box body 1.

Referring to FIG. 2 and FIG. 3, the supporting plate 14 and the side plate portion 112 of the base body 11 face each other and are fixedly connected with the first protecting assembly 12 and the second protecting assembly 13 in the up-down direction Z, and the supporting plate 14, the side plate portion 112, the second protecting assembly 13 and the first protecting assembly 12 are connected to form a mouth-shaped structure, the mouth-shaped structure increases the bending resistance of the mounting location of the lower box body 1, thereby avoiding the deformation or even failure of the mounting location caused by the fixing member 5 acting on the mounting location.

Referring to FIG. 2 to FIG. 14, the mounting hole T may comprise a first through hole T1, a second through hole T2, a fourth through hole T4, a third through hole T3, a fifth through hole T5, a seventh through hole T7 and a sixth through hole T6 which are sequentially communicated with each other in the up-down direction Z.

Figure 5:
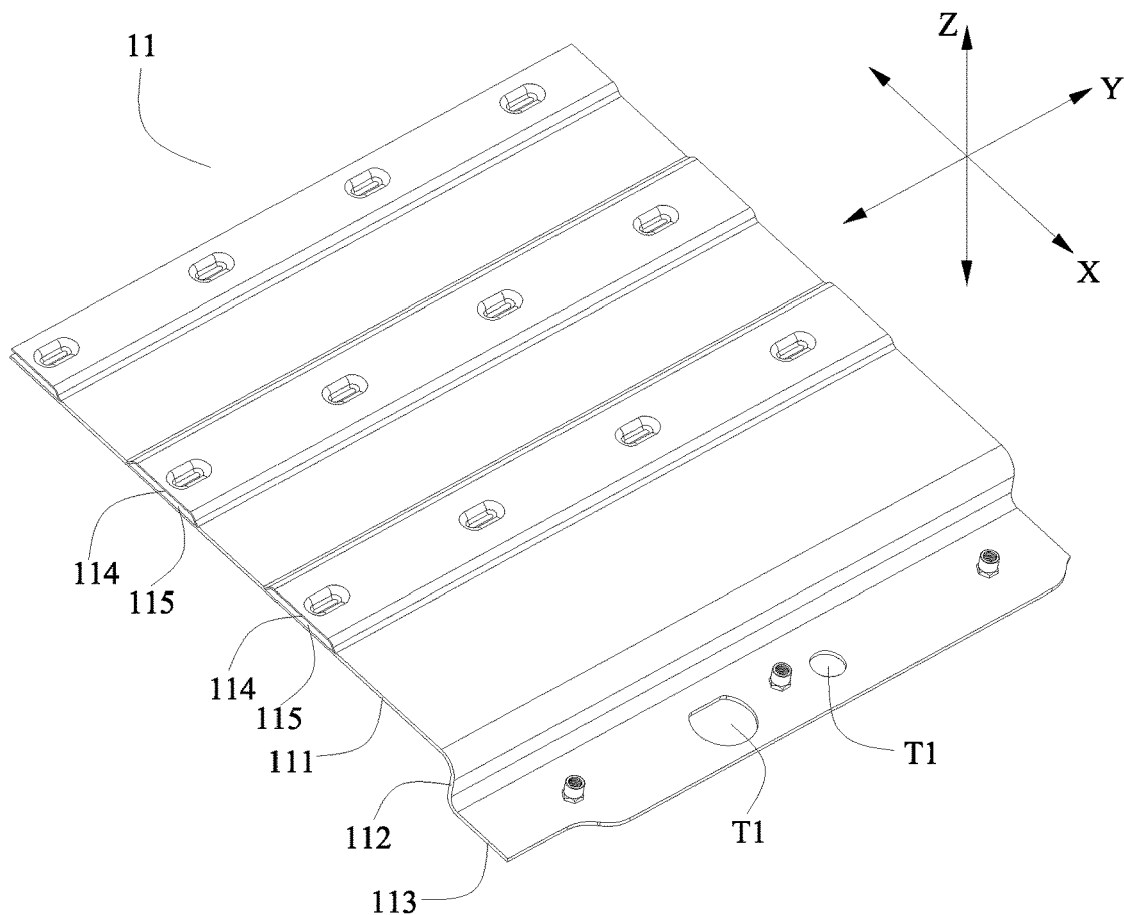
FIG. 5 is a perspective view of a base body of FIG. 4.

Specifically, referring to FIG. 5, the first through hole T1 penetrates the eave portion 113 of the base body 11 in the up-down direction Z. Referring to FIG. 7, the second through hole T2 penetrates the first upper edge portion 121A of the first protecting plate 121 in the up-down direction Z. Referring to FIG. 8, the third through hole T3 penetrates the supporting column 122 in the up-down direction Z. Referring to FIG. 9, the fourth through hole T4 penetrates the second upper edge portion 123A of the adapter plate 123 in the up-down direction Z. Referring to FIG. 12, the fifth through hole T5 penetrates the corresponding first mounting portion 131A of the second protecting plate 131 in the up-down direction Z. Referring to FIG. 13, the sixth through hole T6 penetrates the main body portion 132A of the connecting plate 132 in the up-down direction Z. Referring to FIG. 14, the seventh through hole T7 penetrates the backing plate 133 in the up-down direction Z.

What is claimed is:

1. A lower box body forming a battery box with an upper box body located on the lower box body in an up-down direction of the battery box, the lower box body comprising a base body, a first protecting assembly, and a mounting hole;
    the base body comprising a bottom plate portion, a side plate portion, and an eave portion, the side plate portion protruding from the bottom plate portion in the up-down direction, and the eave portion being connected to one end of the side plate portion away from the bottom plate portion and extending toward an outside of the side plate portion;
    the first protecting assembly being provided at an outside of the base body in the up-down direction and being fixed to the base body, and the first protecting assembly being attached to the eave portion;
    the mounting hole penetrating the eave portion and the first protecting assembly attached to the eave portion in the up-down direction;
    wherein the first protecting assembly comprises a first protecting plate supporting the base body in the up-down direction and a supporting column provided at an outside of a first upper edge portion of the first protecting plate in the up-down direction at an opposite side of the first protecting plate relative to the base body and the upper box body, and
    wherein the mounting hole is configured to penetrate the eave portion, the first upper edge portion, and the supporting column in the up-down direction.

2. The lower box body according to claim 1, wherein the first protecting plate comprises a first upper edge portion attached to the eave portion, a first side edge portion attached to the side plate portion, and a first lower edge portion attached to the bottom plate portion.

3. The lower box body according to claim 2, wherein the base body further comprises a plurality of protruding portions spaced apart from each other and extending in a longitudinal direction, each protruding portion is configured to protrude from the bottom plate portion in the up-down direction, and each protruding portion and the bottom plate portion is configured to form a passage;
    the first protecting plate further comprises a first projection portion protruding from the first lower edge portion in the up-down direction, and the first projection portion is larger than the protruding portion in height in the up-down direction.

4. The lower box body according to claim 1, wherein the first protecting assembly further comprises an adapter plate provided between the first protecting plate and the supporting column; and
    the mounting hole is configured to penetrate the eave portion, the first upper edge portion, the adapter plate and the supporting column in the up-down direction.

5. The lower box body according to claim 4, wherein the adapter plate comprises a second upper edge portion provided at the outside of the first upper edge portion, a second side edge portion provided at an outside of the first side edge portion, a second lower edge portion provided at an outside of the first lower edge portion, and a second projection portion extending from one side of the second side edge portion facing the supporting column toward the supporting column;
    the supporting column is fixedly connected with the second upper edge portion and the second projection portion.

6. The lower box body according to claim 1, wherein the lower box body further comprises a second protecting assembly provided at an outside of the first protecting assembly in the up-down direction, and the second protecting assembly is attached to the first protecting assembly and a corresponding portion of the base body;
    the mounting hole is configured to penetrate the eave portion, the first protecting assembly and the second protecting assembly in the up-down direction.

7. The lower box body according to claim 6, wherein the first protecting assembly and the second protecting assembly each are provided as multiple in number, the multiple second protecting assemblies and the multiple first protecting assemblies form a three-dimensional network structure.

8. The lower box body according to claim 7, wherein the second protecting assembly comprises a second protecting plate attached to the first protecting assembly and the corresponding portion of the base body, and a connecting plate provided on one side of the second protecting plate away from the first protecting assembly in the up-down direction and attached to the second protecting plate and the first protecting assembly;
    the mounting hole is configured to penetrate the eave portion, the first protecting assembly, the second protecting plate and the connecting plate in the up-down direction.

9. The lower box body according to claim 8, wherein the second protecting plate comprises a first mounting portion attached to the first protecting assembly, a second mounting portion formed at one side of the first mounting portion and attached to the corresponding portion of the base body, and a third projection portion protruding from the second mounting portion in the up-down direction;
    the mounting hole is configured to penetrate the eave portion, the first protecting assembly, the first mounting portion and the connecting plate in the up-down direction.

10. The lower box body according to claim 8, wherein the second protecting plate further comprises a backing plate fixedly provided between the second protecting plate and the corresponding first protecting assembly;
    the mounting hole is configured to penetrate the eave portion, the first protecting assembly, the backing plate, the second protecting plate and the connecting plate in the up-down direction.

11. The lower box body according to claim 7, wherein the lower box body further comprises a supporting plate facing the side plate portion of the base body and fixedly connected with the first protecting assembly and the second protecting assembly.

12. The lower box body according to claim 9, wherein the second protecting plate further comprises a first rim portion formed on both sides of the first mounting portion and fixedly connected with the eave portion of the base body.

13. The lower box body according to claim 9, wherein the second protecting plate further comprises a protrusion protruding from a surface of the first mounting portion facing the first protecting assembly and attached to the first protecting plate.

14. A battery box, comprising an upper box body and a lower box body, wherein the upper box body is located on the lower box body in an up-down direction of the battery box,
the lower box body comprises a base body, a first protecting assembly and a mounting hole;
the base body comprises a bottom plate portion, a side plate portion, and an eave portion, the side plate portion protrudes from the bottom plate portion in an up-down direction, and the eave portion is connected to one end of the side plate portion away from the bottom plate portion and extends toward an outside of the side plate portion;
the first protecting assembly is provided at an outside of the base body in the up-down direction and is fixed to the base body, and the first protecting assembly is attached to the eave portion;
the mounting hole penetrates the eave portion and the first protecting assembly attached to the eave portion in the up-down direction;
wherein the first protecting assembly comprises a first protecting plate supporting the base body in the up-down direction and a supporting column provided at an outside of a first upper edge portion of the first protecting plate in the up-down direction at an opposite side of the first protecting plate relative to the base body and the upper box body, and
wherein the mounting hole is configured to penetrate the eave portion, the first upper edge portion, and the supporting column in the up-down direction.

15. The battery box according to claim 14, wherein
the first protecting plate comprises a first upper edge portion attached to the eave portion, a first side edge portion attached to the side plate portion, and a first lower edge portion attached to the bottom plate portion.

16. The battery box according to claim 15, wherein
the base body further comprises a plurality of protruding portions spaced apart from each other and extending in a longitudinal direction, each protruding portion is configured to protrude from the bottom plate portion in the up-down direction, and each protruding portion and the bottom plate portion is configured to form a passage;
the first protecting plate further comprises a first projection portion protruding from the first lower edge portion in the up-down direction, and the first projection portion is larger than the protruding portion in height in the up-down direction.

17. The battery box according to claim 14, wherein
the first protecting assembly further comprises an adapter plate provided between the first protecting plate and the supporting column; and
the mounting hole is configured to penetrate the eave portion, the first upper edge portion, the adapter plate and the supporting column in the up-down direction.

18. A vehicle, comprising a body and a battery box, and the battery box comprising an upper box body and a lower box body,
wherein the upper box body is located on the lower box body in an up-down direction of the battery box,
wherein the lower box body comprises a base body, a first protecting assembly and a mounting hole;
the base body comprises a bottom plate portion, a side plate portion, and an eave portion, the side plate portion protrudes from the bottom plate portion in the up-down direction, and the eave portion is connected to one end of the side plate portion away from the bottom plate portion and extends toward an outside of the side plate portion;
the first protecting assembly is provided at an outside of the base body in the up-down direction and is fixed to the base body, and the first protecting assembly is attached to the eave portion;
the mounting hole is configured to penetrate the eave portion and the first protecting assembly attached to the cave portion in the up-down direction, and the mounting hole is configured to fixedly mount the battery box to the body;
wherein the first protecting assembly comprises a first protecting plate supporting the base body in the up-down direction and a supporting column provided at an outside of a first upper edge portion of the first protecting plate in the up-down direction at an opposite side of the first protecting plate relative to the base body and the upper box body, and wherein the mounting hole is configured to penetrate the eave portion, the first upper edge portion, and the supporting column in the up-down direction.

* * * * *